United States Patent Office 3,813,426
Patented May 28, 1974

---

3,813,426
S,S-2-CHLOROALKYL THIOPEROXYOXAMATES AND THEIR MANUFACTURE
Wendell Gary Phillips, Olivette, Mo., assignor to Monsanto Company, St. Louis, Mo.
No Drawing. Filed Feb. 4, 1972, Ser. No. 223,709
Int. Cl. C07c 69/00
U.S. Cl. 260—453 R        12 Claims

ABSTRACT OF THE DISCLOSURE

S,S-2-chloroalkyl thioperoxyamates are prepared from oxamoyl sulfenyl chlorides by reaction with episulfides. The S,S-2-chloroalkylthioperoxyoxamates are pesticidally active and particularly useful as herebicides.

---

This invention relates to S,S-2-chloroalkyl thioperoxyoxamates of the formula

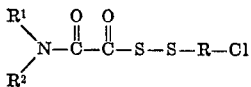

wherein R is alkylene of from 2 through 6 carbons provided that the chlorine and the sulfur are bonded to adjacent carbons and $R^1$ and $R^2$ are each independently hydrogen, lower alkyl, benzyl, phenyl, substituted phenyl wherein the ring substituents thereof total from 1 to 3 same or different substituents selected from the group of substituents consisting of lower alkyl, lower alkoxy, halo, nitro, and trifluoromethyl, provided that the number of lower alkoxy substituents be from 0 to 2, the number of nitro substituents be from 0 to 2, and the number of trifluoromethyl substituents be from 0 to 2, substituted benzyl wherein the substituents are on the phenyl ring and are as defined for substituted phenyl, or $R^1$ and $R^2$ when taken together are alkylene of the empirical formula $C_nH_{2n}$ wherein $n$ is an integer from 4 through 8, inclusive, and having from 4 through 8 carbons in a continuous chain between the nitrogen terminal valence bonds.

Lower alkyl is alkyl having from 1 to 5 carbons. Examples of lower alkyl include methyl, ethyl, propyl, butyl, pentyl and the various isomeric forms thereof.

Lower alkoxy have from 1 to 5 carbons. Examples of alkoxy include methoxy, ethoxy, propoxy, butoxy, pentoxy and the various isomeric forms thereof.

Halo is a halogen selected from the group consisting of fluorine, chlorine, bromine and iodine.

Examples of heterocyclic groups of nitrogen and alkylene of the empirical formula $C_nH_{2n}$ wherein $n$ is an integer from 4 through 8, inclusive, and having from 4 through 8 carbons in a continuous chain between the nitrogen terminal valence bonds include, but are not limited to, pyrrolidinyl, piperidinyl, hexamethyleneimino, heptamethyleneimino, octamethyleneimino, 2-ethylpyrrolidinyl, 3-butylpyrrolidinyl, 2,5-dimethylpyrrolidinyl, 2,5-diethylpyrrolidinyl, 3,4-dimethylpyrrolidinyl, 2-pipecolinyl, 3-pipecolinyl, 4-pipecolinyl, 2,6-dimethylpiperidinyl, 2-ethyl - 6 - methyl - piperidinyl, 2 - propylpiperidinyl, 3-methylhexamethyleneimino, 3,4 - dimethylhexamethyleneimino, and the various isomeric forms thereof.

The compounds of this invention are conveniently and efficiently prepared by the reaction of about equimolecular proportions of an oxamoyl sulfenyl chloride of the formula

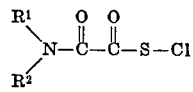

wherein $R^1$ and $R^2$ have the aforementioned significance and an episulfide of the formula

wherein R is alkyl of from 2 through 6 carbons and 2 of which adjacent carbons form with the sulfur a three membered ring. While the mechanism of the reaction is not completely understood, it is postulated that the reaction proceeds as follows:

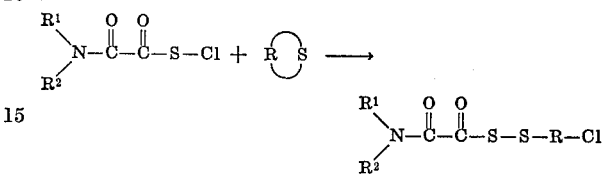

The reaction mass may consist only of the aforedescribed reactants and their reaction products or it may contain other components in addition such as diluents, other inert materials and solvents, i.e., common organic liquids which are inert under the reaction conditions and which may dissolve one or more of the reactants or products of the reaction, which solvents are exemplified by, but not limited to, aliphatic hydrocarbons, such as pentane, hexane, mineral spirits, petroleum ether, etc., aromatics such as benzene, toluene, xylenes, etc., ethers such as diethyl ether, diisopropyl ether, etc., esters such as methyl acetate, ethyl acetate, propyl acetate, etc., and other organics such as tetrahydrofuran, etc. Aromatics are particularly preferred solvents.

The reaction is normally carried out at a temperature above the freezing point of the system but preferably not above its boiling point. Still more preferably, the reaction is carried out at temperatures of from about room temperature, about 23 degrees centigrade (° C.) to the boiling point of the system. The reaction is most conveniently carried out under reflux, in the presence of a solvent. The reaction is usually carried out at atmospheric pressure, but higher or lower pressures may be utilized if equipment and other factors favor such higher or lower pressures. The reaction may be carried out in an open or closed vessel.

S,S-2-chloroalkyl thioperoxyoxamates of this invention are useful as biocides. Exemplary of such biocidal uses for these products is the control of nematodes, arachnids, arthropods and insects as well as eradication of noxious weeds. These compounds are particularly useful as pre-emergent and contact herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of oxamoyl sulfenyl chlorides, used as starting materials in the preparation of the compounds of the present invention, is taught in prior U.S. patent application Ser. No. 177,096 filed Sept. 1, 1971, entitled "Oxamoyl Sulfenyl Chlorides and Their Manufacture," which issued Sept. 11, 1973, as U.S. Pat. No. 3,758,568. Episulfides useful herein are either known compounds or may be prepared by known methods from known compounds.

As illustrative of this invention, but not limitative thereof, is the following:

EXAMPLE 1

To a suitable reaction vessel equipped with an agitator is charged approximately 300 milliliters (ml.) of benzene, approximately 5 grams (g.), about 0.02 moles, of para-chlorooxaniloyl sulfenyl chloride and approximately 1.2 g., about 0.02 moles, of ethylene episulfide,

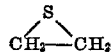

The mass is refluxed for about 30 minutes. Thereafter the benzene is removed by vacuum distillation leaving an oily residue which solidifies upon standing. The solid is dissolved in and recrystallized twice from petroleum ether. The white solid is found to have a melting point of about 98 to 104° C., to be soluble in acetone, and to be insoluble in water, and is identified by nuclear magnetic resonance and elemental analysis as S,S-2-chloroethyl para-chlorothioperoxyoxanilate

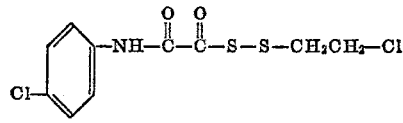

Calculated for $C_{10}H_9Cl_2NO_2S_2$: C, 38.72; H, 2.92; N, 4.52; Cl, 22.86. Found: C, 38.57; H, 2.90; N, 4.46; Cl, 22.65.

EXAMPLES 2 THROUGH 25

The procedure of Example 1 is followed except that, in place of about 5 g. of para-chlorooxaniloyl sulfenyl chloride, an approximately equimolecular amount of the compound of Column A is charged and the product of Column B is obtained:

| Example | A | B |
|---|---|---|
| 2 | CF₃–C₆H₄–NH–C(O)–C(O)–S–Cl | CF₃–C₆H₄–NH–C(O)–C(O)–S–S–CH₂CH₂–Cl |
| 3 | Br–C₆H₄–NH–C(O)–C(O)–S–Cl | Br–C₆H₄–NH–C(O)–C(O)–S–S–CH₂CH₂–Cl |
| 4 | 2,6-(CH₃)₂C₆H₃–NH–C(O)–C(O)–S–Cl | 2,6-(CH₃)₂C₆H₃–NH–C(O)–C(O)–S–S–CH₂CH₂–Cl |
| 5 | 2-CH₃-C₆H₄–N(C₂H₅)–C(O)–C(O)–S–Cl | 2-CH₃-C₆H₄–N(C₂H₅)–C(O)–C(O)–S–S–CH₂CH₂–Cl |
| 6 | 4-C₂H₅-C₆H₄–N((CH₂)₄CH₃)–C(O)–C(O)–S–Cl | 4-C₂H₅-C₆H₄–N((CH₂)₄CH₃)–C(O)–C(O)–S–S–CH₂CH₂–Cl |
| 7 | 2,4,6-(CH₃CH(CH₃))₃C₆H₂–N(CH(CH₃)₂)–C(O)–C(O)–S–Cl | 2,4,6-(CH₃CH(CH₃))₃C₆H₂–N(CH(CH₃)₂)–C(O)–C(O)–S–S–CH₂CH₂–Cl |
| 8 | C₆H₅–N(C₆H₅)–C(O)–C(O)–S–Cl | C₆H₅–N(C₆H₅)–C(O)–C(O)–S–S–CH₂CH₂–Cl |

TABLE—Continued

| Example | A | B |
|---|---|---|
| 9 | (CH₃)₃C–N(CH₂-C₆H₄-CH₃)–C(O)–C(O)–S–Cl | (CH₃)₃C–N(CH₂-C₆H₄-CH₃)–C(O)–C(O)–S–S–CH₂CH₂–Cl |
| 10 | C₆H₅CH₂–N(C₆H₅)–C(O)–C(O)–S–Cl | C₆H₅CH₂–N(C₆H₅)–C(O)–C(O)–S–S–CH₂CH₂–Cl |
| 11 | CH₃(CH₂)₃–N(CH₃(CH₂)₃)–C(O)–C(O)–S–Cl | CH₃(CH₂)₃–N(CH₃(CH₂)₃)–C(O)–C(O)–S–S–CH₂CH₂–Cl |
| 12 | (CH₂)₄N–C(O)–C(O)–S–Cl | (CH₂)₄N–C(O)–C(O)–S–S–CH₂CH₂–Cl |
| 13 | (CH₂)₅N–C(O)–C(O)–S–Cl | (CH₂)₅N–C(O)–C(O)–S–S–CH₂CH₂–Cl |
| 14 | (CH₃)₂CH–N(CH(CH₃)₂)–C(O)–C(O)–S–Cl (isopropyl groups via CH₂) | (CH₃)₂CH–N(CH(CH₃)₂)–C(O)–C(O)–S–S–CH₂CH₂–Cl |
| 15 | CH₃(C₆H₅CH₂)N–C(O)–C(O)–S–Cl | CH₃(C₆H₅CH₂)N–C(O)–C(O)–S–S–CH₂CH₂–Cl |
| 16 | CH₃–N(C₆H₄-CH₂CH(CH₃)₂)–C(O)–C(O)–S–Cl | CH₃–N(C₆H₄-CH₂CH(CH₃)₂)–C(O)–C(O)–S–S–CH₂CH₂–Cl |
| 17 | 2,6-Cl₂C₆H₃–NH–C(O)–C(O)–S–Cl | 2,6-Cl₂C₆H₃–NH–C(O)–C(O)–S–S–CH₂CH₂–Cl |
| 18 | 3,4-(CF₃)₂C₆H₃–N(CH₃)–C(O)–C(O)–S–Cl | 3,4-(CF₃)₂C₆H₃–N(CH₃)–C(O)–C(O)–S–S–CH₂CH₂–Cl |
| 19 | 3-I-C₆H₄–NH–C(O)–C(O)–S–Cl | 3-I-C₆H₄–NH–C(O)–C(O)–S–S–CH₂CH₂–Cl |
| 20 | 4-NO₂-C₆H₄–NH–C(O)–C(O)–S–Cl | 4-NO₂-C₆H₄–NH–C(O)–C(O)–S–S–CH₂CH₂–Cl |
| 21 | (4-F-C₆H₄)(4-F-C₆H₄)N–C(O)–C(O)–S–Cl | (4-F-C₆H₄)(4-F-C₆H₄)N–C(O)–C(O)–S–S–CH₂CH₂–Cl |
| 22 | (CH₃)₃C–N(CH₂-2,6-Br₂C₆H₃)–C(O)–C(O)–S–Cl | (CH₃)₃C–N(CH₂-2,6-Br₂C₆H₃)–C(O)–C(O)–S–S–CH₂CH₂–Cl |

TABLE—Continued

| Example | A | B |
|---|---|---|
| 23 | ![Structure: 2,4,6-trichlorophenyl with CH₃-N-C(O)-C(O)-S-Cl] | ![Structure: 2,4,6-trichlorophenyl with CH₃-N-C(O)-C(O)-S-S-CH₂CH₂-Cl] |
| 24 | ![Structure: 2,4,5-trifluorophenyl-NH-C(O)-C(O)-S-Cl] | ![Structure: 2,4,5-trifluorophenyl-NH-C(O)-C(O)-S-S-CH₂CH₂-Cl] |
| 25 | ![Structure: 2-isopropylphenyl with CH₃-N-C(O)-C(O)-S-Cl] | ![Structure: 2-isopropylphenyl with CH₃-N-C(O)-C(O)-S-S-CH₂CH₂-Cl] |

EXAMPLE 26

The procedure of Example 1 is followed except that, in place of about 1.2 g. of ethylene episulfide an approximately equimolecular amount of 2,3-dimethyl-2,3-butylene episulfide is charged and S,S-2-chloro-1,1,2,2-tetramethylethyl parachlorothioperoxyoxanilate

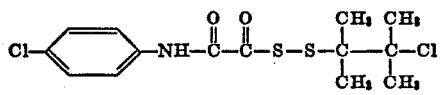

is obtained.

EXAMPLE 27

Contact herbicidal activity of representative S,S-2-chloroalkyl thioperoxyoxamates of this invention is determined by the following procedure:

A good grade of top soil is placed in aluminum pans and compacted to a depth of ⅜ to ½ inch from the top of the pan. A pre-determined number of seeds of each of several broadleaf and grassy plant species are placed on top of the soil in the pans. The seeds are covered with soil and the pans leveled. The pans are then placed on a sand bench in the greenhouse and watered from below as needed. After the plants are the desired age, each pan of plants is sprayed with a given volume of a 0.2% concentration solution of the candidate chemical, corresponding to a rate of approximately 4 lbs. per acre. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are then observed approximately 14 days later and the results are recorded.

Contact herbicidal activity of the compound prepared in Example 1 is observed against lambsquarter, Canada thistle, cocklebur, and downy brome.

EXAMPLE 28

Pre-emergent herbicidal activity of representative S,S-2-chloroalkyl thioperoxyoxamates of this invention is determined by the following procedure:

A good grade of top soil is placed in aluminum pans and compacted to a depth of ⅜ to ½ inch from the top of the pan. A predetermined number of seeds of each of several broadleaf and grassy plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a sand bench in the greenhouse and watered from below as needed. The plants are observed at the end of approximately 14 days and the results recorded.

Pre-emergent activity of the compound prepared in Example 1 is observed against Canada thistle, cocklebur, Johnson grass, and downy brome.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be constructed as encompassing all the features of patentable novelty which reside in the present invention thereof by those skilled in the art to which the invention pertains.

What is claimed is:

1. An S,S-2-chloroalkyl thioperoxyoxamate of the formula

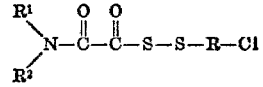

wherein R is alkylene of from 2 through 6 carbons provided that the chlorine and the sulfur are bonded to adjacent carbons and $R^1$ and $R^2$ are each independently hydrogen, lower alkyl, benzyl, phenyl, substituted phenyl wherein the ring substituents thereof total from 1 to 3 same or different substituents selected from the group of substituents consisting of lower alkyl, lower alkoxy, halo, nitro, and trifluoromethyl, provided that the number of lower alkoxy substituents be from 0 to 2, the number of nitro substituents be from 0 to 2, and the number of trifluoromethyl substituents be from 0 to 2, substituted benzyl wherein the substituents are on the phenyl ring and are as defined for substituted phenyl.

2. A compound of claim 1 wherein $R^1$ is hydrogen.
3. A compound of claim 2 wherein $R^2$ is substituted phenyl.
4. A compound of claim 3 wherein the ring substituents are halo.
5. A compound of claim 4 wherein the halo is chlorine.
6. A compound of claim 5 wherein $R^2$ is parachlorophenyl.
7. A compound of claim 6 wherein R is $CH_2CH_2$.
8. A compound of claim 1 wherein R is $CH_2CH_2$.

9. A compound of claim 8 wherein $R^1$ is hydrogen.
10. A compound of claim 9 wherein $R^2$ is lower alkyl.
11. A compound of claim 8 wherein $R^1$ and $R^2$ are each lower alkyl.
12. A compound of claim 8 wherein $R^1$ is lower alkyl and $R^2$ is substituted phenyl.

References Cited

UNITED STATES PATENTS

| | | | |
|---|---|---|---|
| 3,428,665 | 2/1969 | Aichenegg et al. | 260—453 R |
| 2,553,777 | 5/1951 | Hawley et al. | 260—453 R |
| 2,774,794 | 12/1956 | Stewart | 260—608 |
| 3,717,681 | 2/1973 | Brodnitz | 260—608 |
| 3,419,620 | 12/1968 | Becher et al. | 71—87 |

OTHER REFERENCES

Metzger et al., "The Azole Series VIII, etc.," (1956), CA 50, p. 15512 (1956).

GLENNON H. HOLLRAH, Primary Examiner

U.S. Cl. X.R.

260—239 BF, 293.85, 326.84; 111—88, 94, 95, 98; 424—244, 267, 274, 298